United States Patent [19]

Meerwald et al.

[11] 3,930,941

[45] Jan. 6, 1976

[54] FUEL ELEMENT FOR A REACTOR

[75] Inventors: Ekkehard Meerwald, Monchweiler; Mario Dalle Donne, Blankenloch-Buchig, both of Germany

[73] Assignee: Gesellschaft fur Kernforschung m.b.H., Karlsruhe, Germany

[22] Filed: Nov. 9, 1973

[21] Appl. No.: 414,447

[30] Foreign Application Priority Data

Nov. 14, 1972 Germany.............................. 2255699

[52] U.S. Cl.................................. 176/81; 165/181
[51] Int. Cl.............................................. G21c 3/08
[58] Field of Search......... 176/67, 81; 165/181, 185

[56] References Cited

UNITED STATES PATENTS 3,261,756    7/1966    Ripley................................... 176/81

*Primary Examiner*—Stephen C. Bentley
*Attorney, Agent, or Firm*—Spencer & Kaye

[57] ABSTRACT

The outer surface of a cladding tube of a nuclear fuel element is — for the purpose of improving the heat exchange between the cladding tube and a surrounding coolant — provided with a plurality of parallel fin rows extending normal to the cladding tube axis. Each row is constituted by a plurality of spaced, individual fins; the fins of any one row are offset with respect to the fins of an immediately adjacent row.

3 Claims, 5 Drawing Figures

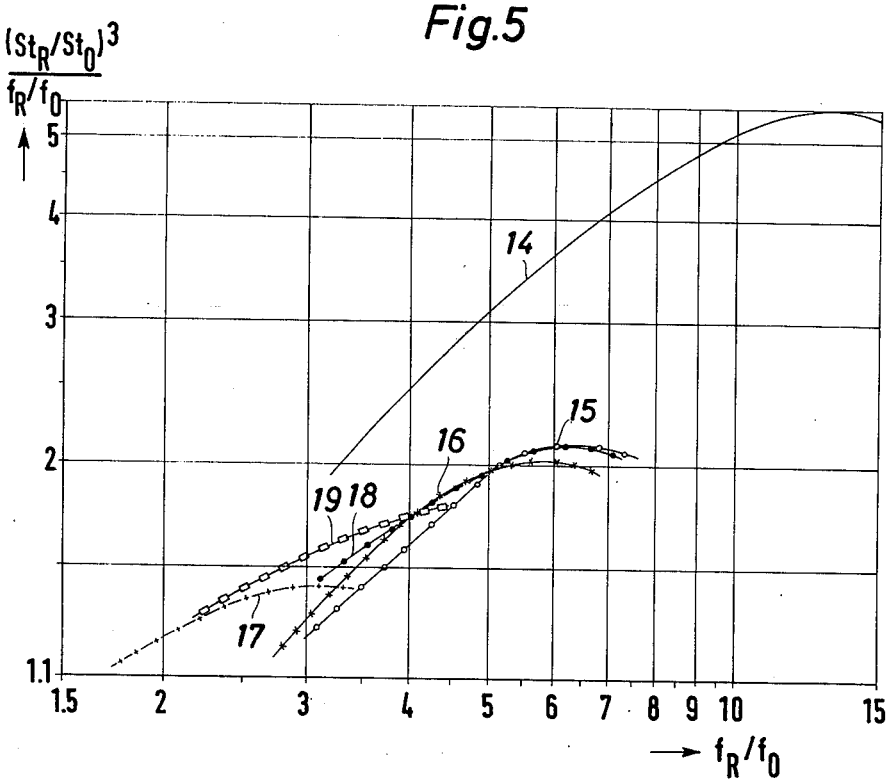

FUEL ELEMENT FOR A REACTOR

BACKGROUND OF THE INVENTION

The present invention relates to a fuel element for a reactor, especially for a gas cooled nuclear reactor, with roughness elements on the surface of the cladding tube in order to improve the heat transfer between that surface and the coolant surrounding it.

It is a well known fact (Proceedings of the 1970 Heat Transfer and Fluid Mechanics Institute, Stanford, California, pp. 354–370) that roughnesses (elevations on a surface influencing only the boundary layer of a flow) can improve the heat transfer between the cladding surface of a fuel element and the coolant. At the same time, however, this measure will also enhance the pressure drop in the coolant duct.

It is also known from the same publication and another one (Druckverlust und Wärmeübergang an glatten und rauhen Flachen, External Report No. 4/71-29, Karlsruhe Nuclear Research Center) that every roughness is characterized by a specific quantity, the so called roughness function, $R$ ($h^+$). "Roughness elements" are elevations on a surface which influence only the boundary layer of the coolant flow. This means that the ratio between the height of the roughness and the hydraulic diameter should be below 0.02. If this roughness function is known, the friction coefficient of a specific geometric arrangement, e.g., a bundle of roughened rods of the type used in a gas cooled reactor, can be calculated for a defined roughness.

It can also be taken from these publications that a low value of $R$ ($h^+$) results in a high friction coefficient with the heat transfer coefficient rising at the same time.

Since the pressure drop is directly proportional to the circulator power, the ratio between the improvement in heat transfer and the increase in the pressure drop determines any optimization of a circuit of a gas cooled reactor.

The following calculation clearly shows these conditions. The terms and quantities have the following meanings:

$Q$ = power transferred from the fuel element pins to the coolant
$\Delta T$ = temperature difference between the wall and the coolant
$m$ = mass flow
$h$ = heat transfer coefficient
$U$ = circumference of fuel element pins
$L$ = free cross section
$\rho$ = density
$cp$ = specific heat
$f$ = friction coefficient $$f = \frac{\Delta P}{L} \cdot \frac{d_h}{2\bar{u}^2}$$

$d_h$ = hydraulic diameter $$= \frac{4F}{U}$$

$\bar{u}$ = mean velocity
$\Delta p$ = pressure drop $$\text{Pumping power } Np = \frac{m}{\rho} \cdot \Delta P \quad (1)$$

$$= \frac{m^3}{2\rho^2} \cdot \frac{L U}{F^3} \cdot f \quad (2)$$

From the definition of the St-number $$St = \frac{Nu}{Re \cdot Pr} = \frac{h \cdot F}{cp \cdot m} \quad (3)$$

and the heat transfer coefficient $$h = \frac{Q}{U \cdot L \cdot \Delta T} \quad (4)$$

we obtain $$\frac{m}{F} = \frac{1}{St} \cdot \frac{Q}{U \cdot L \Delta T cp} \quad (5)$$

Substituting Eq. (5) in Eq. (2) results in this relation:

$$Np = Q^3 \cdot \frac{1}{2\rho^2 \cdot cp^2} \cdot \frac{1}{\Delta T^3} \cdot \frac{1}{U^2 \cdot L^2} \cdot \frac{f}{St^3} \quad (6)$$

For a given power of the reactor ($Q$), coolant ($\rho$, $cp$), temperature difference ($\Delta T$) and dimensions of the fuel pins ($U,L$), the pumping power is $$Np \sim \frac{f}{St^3} \quad (7)$$

Consequently, that roughness is optimal which supplies the lowest ratio of $f/St^3$.

Usually, the values of the friction coefficient $f$ and the heat transfer ratio $St$ are referred to the corresponding values (i.e., at the same $Re$ number) of a smooth surface. This will directly indicate the factor by which the two quantities have changed.

Normally, the roughness elements consist of circumferential fins made by cutting of the tubes. The improvement in heat transfer and the increase in the pressure drop is a function of the $P/h$ ratio of the roughness, the optimum being at a $P/h$ = 7–10 ($P$ = distance of the roughness elements, $h$ = roughness height). For this type of roughness the minimum roughness parameter is found to be $R$ ($h^+$) = 3.0.

Locally, there is a very steep rise in the local heat transfer coefficient at the leading edge of an elevation of the roughness elements. According to measurements by means of mass transfer the local increase in heat transfer can be up to three times higher than the mean value. On the other hand, the local heat transfer coefficient decreases sharply downstream of an elevation in the so-called "dead water region" and rises again after a certain distance (approximately four times the height) as a consequence of the turbulences created by the fin. These two counteracting effects will significantly improve the heat transfer coefficient only at major distances between fins.

SUMMARY OF THE INVENTION

It is the object of the present invention to maximize the number of leading edges and at the same time prevent the formation of large "dead water regions" downstream of every fin.

The solution of this problem in the present invention is characterized by rows of fins consisting of single fins arranged on the cladding tube surface at right angles to the axial direction and by an offset relationship of the fins of any row with respect to the fins of an immediately adjacent row.

In one embodiment of the present invention, the distance between the rows of fins is equal to twice the height of the individual fins and the distance between two fins located on the same generatrix (that is, two fins in alignment along the axis of the cladding tube) is equal to four times the height of the individual fins.

In another embodiment of the present invention the lateral clearance between the fins of a row of fins may be smaller than or equal to the length of the fins. The fins proper may be circular ring segments of a square, rectangular or trapezoidal cross section, or the fins are circular segments of a rhombic shape.

BRIEF DESCRIPTION OF THE DRAWINGS

FIGS. 3, 4 and 5 are diagrams illustrating measured results.

DESCRIPTION OF THE PREFERRED EMBODIMENT

Figure 1:
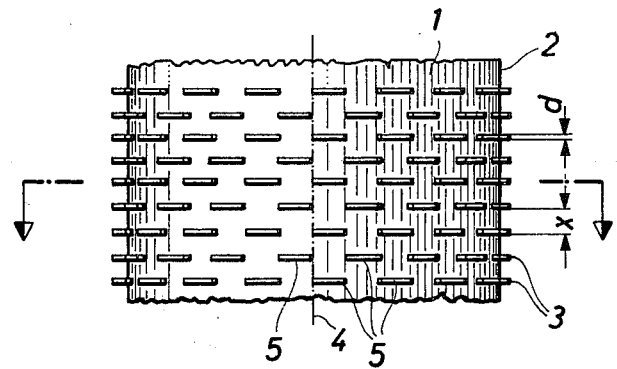
FIG. 1 is a fragmentary longitudinal view of a preferred embodiment of the invention.

FIG. 1 shows part of a cladding tube 1 of a fuel element 2. A plurality of fin rows 3 are provided on the outer tube surface at right angles to the axial direction 4 of the fuel element 2. Each fin row 3 (of which only two are designated) with the reference numeral is constituted of single fins 5. The individual fins 5 are circular segments of a square, rectangular or trapezoidal cross section or have a rhombic shape, respectively. The individual fins 5 of single fin rows 3 are offset relative to each other. This means that any gap between two fins of a given fin row is flanked on both sides by two fins belonging to the two fin rows that are immediately adjacent the given fin row. In this manner meandering passages are obtained. The fins of every other row are always located on the same generatrix of the fuel element 2. The distance $x$ (e.g., $x = 1.6$ mm) between the fin rows 3 is twice the fin height $h$ ($h = 0.8$ mm), so that the unobstructed clearance between two fins 5 that are in alignment parallel to the axis of the tube 1 is four times the height $h$. The width $b$ of the fins 5 in this embodiment is 3 mm. The thickness $d$ of the fins 5 is measured parallel to the axis of the cladding tube 1.

Figure 2:
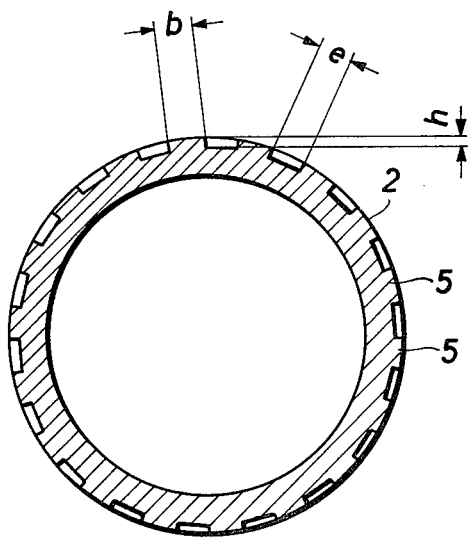
FIG. 2 is a cross-sectional view of the same embodiment.

FIG. 2 is a sectional view of the fuel element 2 showing the individual fins 5 of one of fins. The clearance $e$ between the fins 5 is 2.9 mm in this example, thus slightly smaller than the width $b$ of the fins, which is 3.0 mm in this embodiment.

Figure 3:
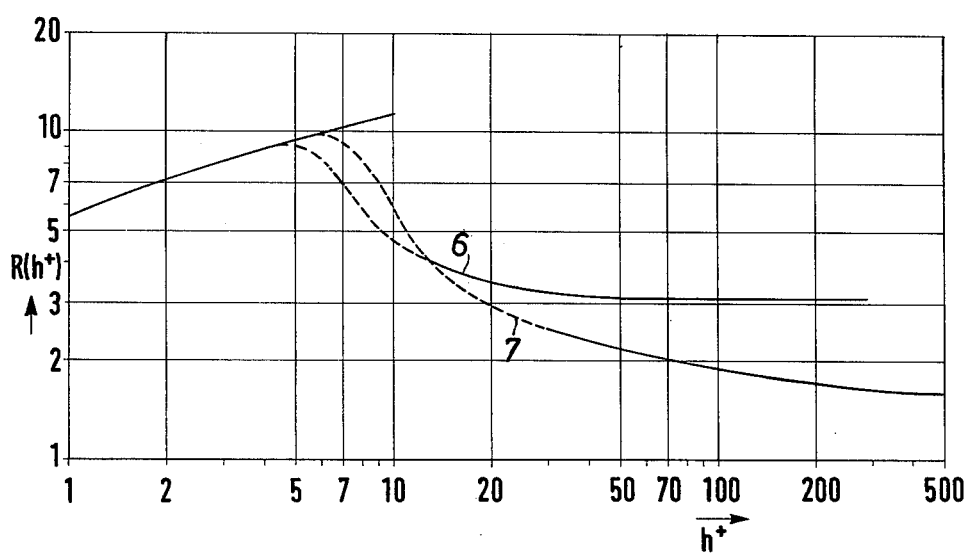

FIG. 3 is a diagram illustrating the roughness parameter R ($h^+$) as a function of the so-called dimensionless roughness height $h^+ = h/d_h \cdot Re \cdot \sqrt{f/2}$.

Two curves 6 and 7 are plotted, curve 7 showing a measured result with offset roughnesses and curve 6 indicating a measured result with the values of $p/h = 9.9$ and $h/b = 1.68$. Evidently, much smaller values of $R$ ($h^+$) are achieved with offset roughnesses, as is shown in curve 7.

Figure 4:
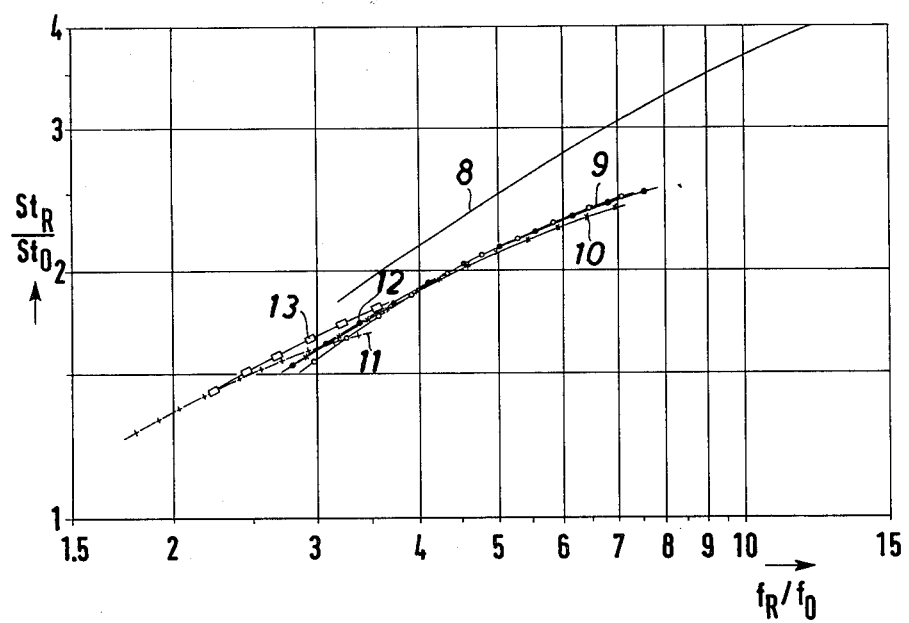

FIG. 4 shows a diagram illustrating the ratios $St_R/St_o$ as a function of $f_R/f_o$ of the offset fins according to curve 8 as compared with circumferential fins with different cross sections. These are curves 9, 10, 11, 12 and with the respective values of $p/h = 9.9$; 10.0; 47.2; 8.0 and 4.1 and the values for $h/b = 1.68$; 1.0; 1.7; 2.45 and 1.55. These measurements were performed in a rod bundle with the values of $p_R/d = 1.4$; $Re = 10^5$; $f_o = 4.55 \times 10^{-3}$ and $St_o = 2.8 \times 10^{-3}$. It is evident that the shape of roughness according to the present invention greatly improves the heat transfer coefficient.

FIG. 5 is a diagram illustrating the ratio $(St_R/St_o)^3/f_R/f_o$ as a function of $f_R/f_o$. Again, a rod bundle with the same data as those shown in FIG. 4 has been used. Curve 14 again shows measured results with the offset roughness elements according to the present invention, while curves 15, 16, 17, 18 and 19 indicate the parameters $p/h$ and $h/b$ as curves 9 to 13 according to FIG. 4. This makes it particularly clear that the shape of roughness according to the present invention furnishes optimum results.

The rod bundle investigated with the fuel element 1 was fabricated by the spark erosion technique. However, it can also be made as an opposed thread by cutting in such a way that a shape of roughness can be generated in which the webs have not a rectangular but a rhombic shape.

What we claim is:

1. A nuclear fuel element cladding tube having a longitudinal axis and an outer surface, comprising a plurality of fins carried on said surface, said fins being arranged in a plurality of parallel-spaced rows extending at right angles to said axis, the fins in any one of said rows being spaced from one another and being offset relative to the fins of an immediately adjacent row, the distance between immediately adjacent rows being twice the height of the individual fins and the distance between two adjacent fins in alignment parallel to said axis being four times said height.

2. A cladding tube as defined in claim 1, wherein the distance between two successive fins of the same row is at most equal to the fin width measured in a direction normal to said axis.

3. A cladding tube as defined in claim 1, wherein said fins are circular segments of rectangular cross section.

* * * * *